UNITED STATES PATENT OFFICE.

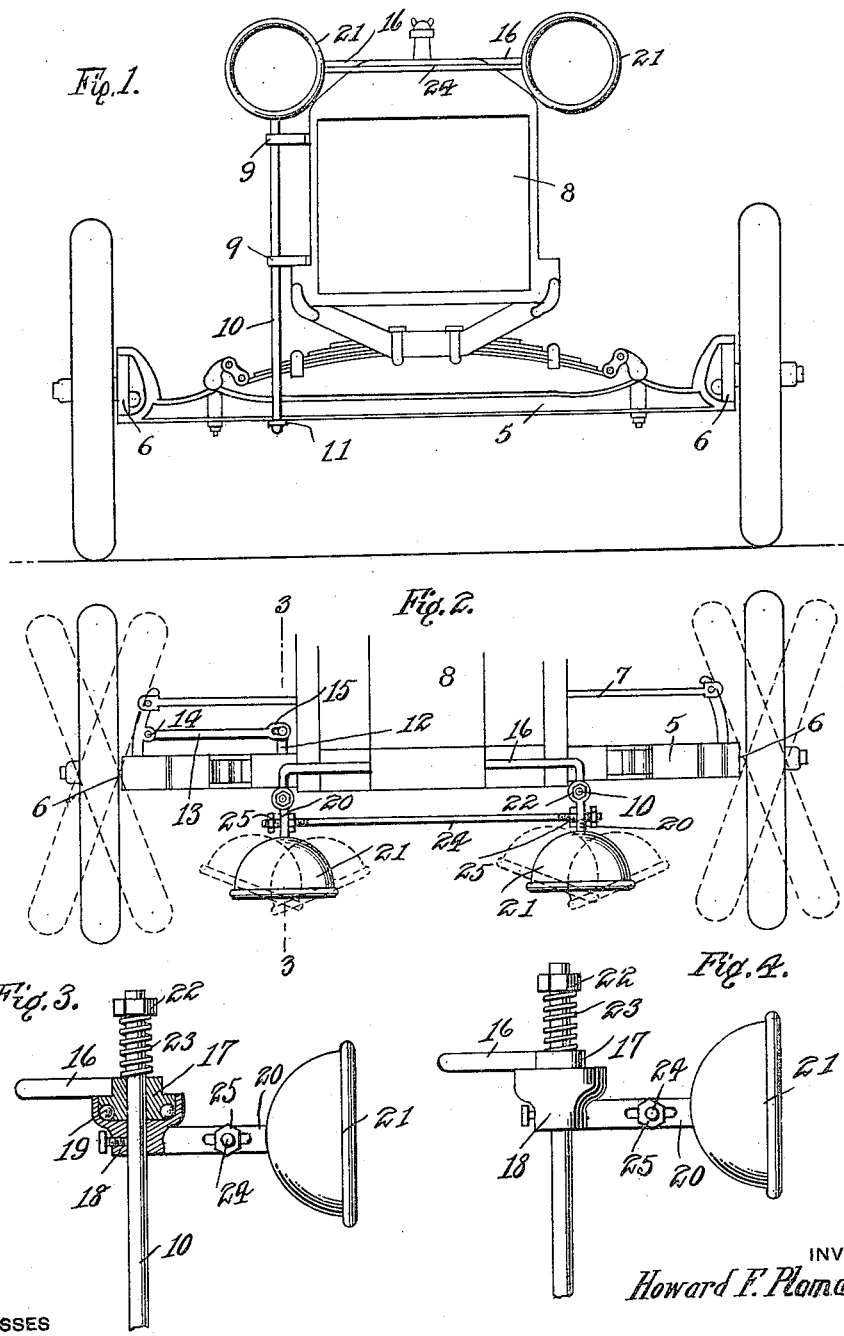

HOWARD F. PLAMANN, OF HIAWATHA, KANSAS.

DIRIGIBLE HEADLIGHT.

1,259,441. Specification of Letters Patent. Patented Mar. 12, 1918.

Application filed September 26, 1916. Serial No. 122,272.

*To all whom it may concern:*

Be it known that I, HOWARD F. PLAMANN, a citizen of the United States, residing at Hiawatha, in the county of Brown and State of Kansas, have invented certain new and useful Improvements in Dirigible Headlights, of which the following is a specification.

This invention relates to dirigible headlights, and particularly to the headlights of motor vehicles.

The invention aims primarily to provide means whereby the lamps upon the motor vehicle may be connected with the steering apparatus of the vehicle so that the rays projected from the lamps will follow the course to be pursued by the vehicle. A further object is to provide means of this character which is so arranged that slight movements of the steering apparatus caused by engagement of the steering wheels with obstructions in the road, will not be transmitted to the lamp standards to operate the same or to cause quivering or flickering of the light projected from the lamp. Still further objects reside in apparatus of this character which is of simple and inexpensive construction; which is composed of but few readily assembled parts, all so constructed and arranged as to prevent wear, breakage or disorder of the same; which shall be positive in operation, which is capable of being readily attached to vehicles now in use; and which will prove thoroughly efficient in the attainment of the desired ends.

With these objects in view, together with others which will appear as the description proceeds, the invention resides in the novel formation, combination and arrangement of parts, all as will be described more fully hereinafter, illustrated in the drawings, and particularly pointed out in the claim.

In the drawings:—

Figure 1 is a front elevation of a conventional form of motor vehicle, and illustrating the application of a lamp actuating apparatus constructed in accordance with the invention;

Fig. 2 is a plan view of the device shown in Fig. 1;

Fig. 3 is a sectional view taken on line 3—3 of Fig. 2; and

Fig. 4 is a side elevation of one of the lamps and its supporting apparatus.

Referring now particularly to the drawings, 5 indicates the front axle of a motor vehicle, 6 the steering knuckles at the ends thereof, 7 the connecting rod for the steering knuckles whereby the latter will turn or rock in unison, and 8 the engine hood and radiator of the vehicle.

Secured in vertical alinement at one side of the radiator 8 and at the forward end thereof are brackets 9, through which a lamp actuating rod 10 extends. This rod extends through a suitable guide 11 secured to the axle of the vehicle, and is provided with a rearwardly extending arm portion 12. A link 13 is pivoted at one end as at 14 to one of the steering knuckles of the vehicle, and is connected at its opposite end to the rear end of the arm 12. This link is provided with an elongated slot 15 at its outer end, and a suitable stud secured to the arm 12 projects through said elongated slot.

The rod 10 extends upwardly through a bracket 16 secured to the vehicle radiator and has at its extremity a bearing cone 17. A socket member 18 is secured to the rod 10 and coöperates with the cone 17 to provide a race for anti-friction rollers such as balls 19. An arm 20 projects from the socket member 18 and carries at its free end a lamp or headlight 21. The upper extremity of the rod 10 is threaded, and receives a nut 22, the latter bearing against one end of a coil spring 23 encircling the rod 10 and bearing at its lower end against the cone portion 17 of the bracket. This spring normally holds the socket member and cone member in close engagement with each other, whereby the anti-friction rollers properly support and separate the said parts, and whereby the rattle of these parts incident to travel over rough roads is obviated.

A bracket 16 is also mounted upon the opposite side of the radiator and which is provided with a cone portion 17 similar to that above described, and a rod 10 is also associated with the last named cone member, and carries a socket member 18. The construction of this lamp support is identical with that before described, and need not be here detailed.

Connecting the arms 20 to which the lamps 21 are secured is a rod or bar 24. This rod is threaded at its ends as shown, and lock nuts 25 are arranged at the extremities of the said rods, one upon each side of the adjacent lamp supporting arm. It is obvious from this construction, that minute adjustment of the lamp arms may be had by operating the adjusting nuts 25.

From the foregoing, it is apparent that I have provided an extremely simple and yet thoroughly efficient means for attaining the ends set forth. After the mechanism has been properly assembled, it will be apparent that lateral movement of the connecting rod of the wheel spindles will operate through the link 13, arm 12, and shaft 10 to rotate the lamps 21 upon their bearings. Minor lateral or oscillating movements of the steering apparatus, however, will not vibrate or oscillate the lamp actuating rod 10, due to the elongated slot and pin connection between the link 13 and arm 12. Thus it is seen that such vibrations as are caused by the wheels on the spindles traveling over uneven surfaces, will not operate to create a quivering action in the headlights. When the vehicle is steered, obviously, the lamps will project the rays in the direction to be assumed by the vehicle, whereby accidents such as collisions, etc., are avoided.

While the present is an illustration of the preferred embodiment of the invention, it is obvious that minor changes in the details of construction and arrangement of parts may be resorted to, when desired, without departing from the spirit of the invention or exceeding the scope of the claim, and the right to make such variation in construction is hereby reserved.

What is claimed is:—

The combination with a vehicle and the steering apparatus thereof, a bracket rigidly secured to said vehicle, a cone portion depending from the outer end of said bracket and being provided with an annular channel at its lower end, a rod extending vertically upon said vehicle and centrally through said cone, a socket member inclosing said rod below said cone, a set screw for holding said socket member firmly upon the rod, an upstanding annular wall on said socket member closely fitting around the said cone, ball bearings confined between said wall and the cone and being disposed in the channel of the latter, an arm affixed to said socket member, a lamp on said arm, an expansion spring encircling the upper end of said rod and resting upon said cone, a nut on the upper extremity of said rod forming an abutment for said spring, and means governed by the movements of said steering apparatus for oscillating said rod.

In testimony whereof I affix my signature in presence of two witnesses.

HOWARD F. PLAMANN.

Witnesses:
 CHARLES GEORGE,
 ANNA M. GEORGE.

Copies of this patent may be obtained for five cents each, by addressing the "Commissioner of Patents, Washington, D. C."